United States Patent [19]

Teitel et al.

[11] 4,432,933

[45] Feb. 21, 1984

[54] PROCESS FOR THE FABRICATION OF THERMONUCLEAR FUEL PELLETS AND THE PRODUCT THEREOF

[75] Inventors: Robert J. Teitel; David E. Solomon, both of Ann Arbor, Mich.

[73] Assignee: KMS Fusion, Inc., Ann Arbor, Mich.

[21] Appl. No.: 675,530

[22] Filed: Apr. 9, 1976

Related U.S. Application Data

[63] Continuation of Ser. No. 339,558, Mar. 9, 1973, abandoned.

[51] Int. Cl.$^3$ .......................... G21B 1/00; G21C 3/04
[52] U.S. Cl. ..................................... 376/152; 376/916; 206/0.5; 206/0.6; 427/5
[58] Field of Search .......................... 176/1, 3; 264/4; 206/0.5, 0.6; 16/DIG. 5; 65/21, 22; 427/5, 6; 376/152

[56] References Cited

U.S. PATENT DOCUMENTS

| | | | |
|---|---|---|---|
| 2,928,529 | 3/1960 | Grosse et al. | 206/6 |
| 3,107,211 | 10/1963 | Mallinckrodt | 176/1 |
| 3,303,097 | 2/1967 | Mallinckrodt | 176/1 |
| 3,378,446 | 4/1968 | Whittlesey | 176/1 |
| 3,414,835 | 12/1968 | Miller . | |
| 3,489,645 | 1/1970 | Darber et al. | 176/1 |
| 3,899,681 | 8/1975 | Beckner et al. | 176/1 |
| 3,953,617 | 4/1976 | Smith et al. | 176/1 |
| 4,154,868 | 5/1979 | Woerner | 176/1 |

FOREIGN PATENT DOCUMENTS

| | | | |
|---|---|---|---|
| 1033565 | 7/1953 | France | 176/1 |
| 841387 | 7/1960 | United Kingdom | 176/1 |

OTHER PUBLICATIONS

Rev. Sci. Instrum., vol. 46, No. 6, 6/75, pp. 682–685, Souers et al.
UCRL-50021-74, 3/75, pp. 367, 371–374.
Nature vol. 239, 9/15/72, Nuckolls et al., pp. 139–142.
Nuclear Fusion vol. 17, No. 1, Feb. 1977, Hora et al., pp. 165–170.
Nature vol. 281, 10/11/79, pp. 414, 415.
The Wall Street Journal, Aug. 28, 1979, pp. 1, 15.
Statement on the LLL Laser Fusion Program Prepared for the JCAE Hearings on Fusion, 3/11/76, pp. 1–4.
1954 U.S. Code Congressional and Administrative News, pp. 3466, 3467, 3480, 3532.
Legislative History of the Atomic Energy Act of 1954, vol. II, pp. 1759, 2305, 2373, 2374.
Legislative History of the Atomic Energy Act of 1954, vol. III, pp. 2849, 2859.
Nuclear Fusion, vol. 10, 1970, by Linhart, pp. 211, 212, 222, 225, 226.
Popular Science, Dec. 1976, pp. 66–71, 148, 150.
Laser Focus, 5/77, p. 6.
New York Times, Jan. 30, 1973, p. 21.
National Defense, May–Jun. 1978, pp. 538–543, 580, 581, 582, 584.
Nuclear News, 3/78, pp. 30–35.
FTD-HT-66-422, 3/67, by Chao et al., pp. 1–9.
Nature, vol. 258, 12/11/75, pp. 512–514.
ERDA-28, 1/75, pp. 1–3, 8–10.
MATT-1050, 8/74, pp. 526–529.
Technology Review, 12/76, pp. 20–24, 32–34, 39, 41–43.
Nuclear Fusion, vol. 15, 12/75, by Mason, pp. 1031–1043.
Fortune, 12/74, pp. 149–152, 154, 156.
Physical Review, vol. 174, No. 1, 10/68, p. 212.
National Defense, Jan.–Feb., 1974, pp. 344–347.
"Application of Laser" CRC Press, 1/74, by Geldman, p. 125.
"Exploding Reactors for Power", Marwick, 1/27/73, pp. 17, 18, 25–27, 37, 38.
AD-781475, 5/1/74, p. 3.
Science, vol. 188, 4/75, pp. 30–34.
"Exploding Reactors for Power", Marwick, 1/27/73, pp. 22, 32, 33.
Laser Focus, 12/74, pp. 18, 20.
J. of Applied Physics, vol. 47, No. 5, 5/76, pp. 1987–1993, Tsugawa et al.

*Primary Examiner*—Harvey E. Behrend
*Attorney, Agent, or Firm*—Barnes, Kisselle, Raisch, Choate, Whittemore & Hulbert

[57] ABSTRACT

In processes utilizing a source of laser energy for achieving a thermonuclear fusion reaction, it is necessary to have fusion fuel prepared in a configuration with minute dimensions and the present invention contemplates preparing this fuel by introducing into hollow microspheres (typically comprised of glass) of predetermined size, in the range of 250 to 2,000 micrometers, a gaseous thermonuclear fuel. One way of accomplishing this is to cause diffusion of gaseous thermonuclear fuel through the walls of the microsphere under conditions of suitable temperature and pressure so that it may be achieved in a reasonable time, after which the fuel can be frozen out on the walls of the microsphere to provide a fusion fuel in a hollow spherical shape. Suitable coatings of additional materials may be applied to the fueled microsphere by appropriate coating methods to complete complex thermonuclear fuel pellet configurations.

12 Claims, 4 Drawing Figures

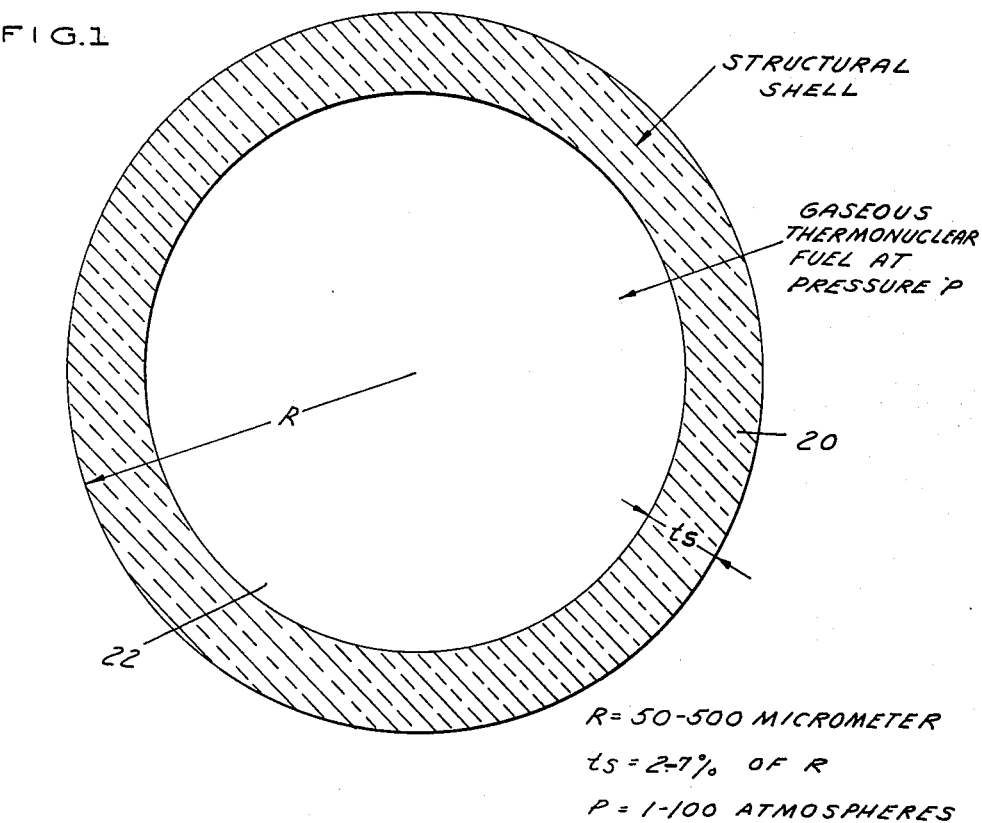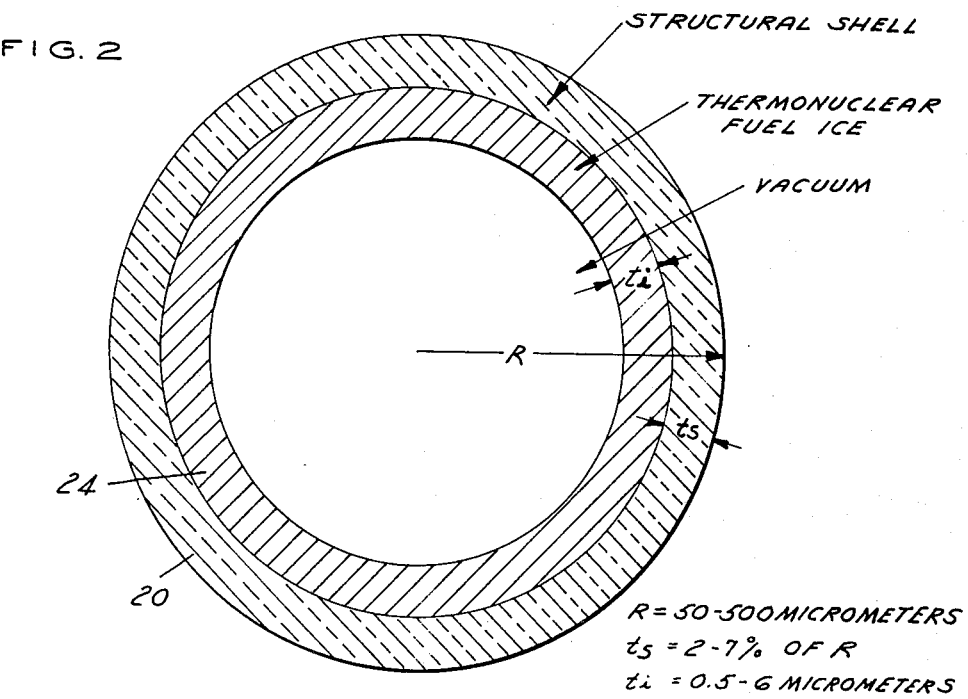

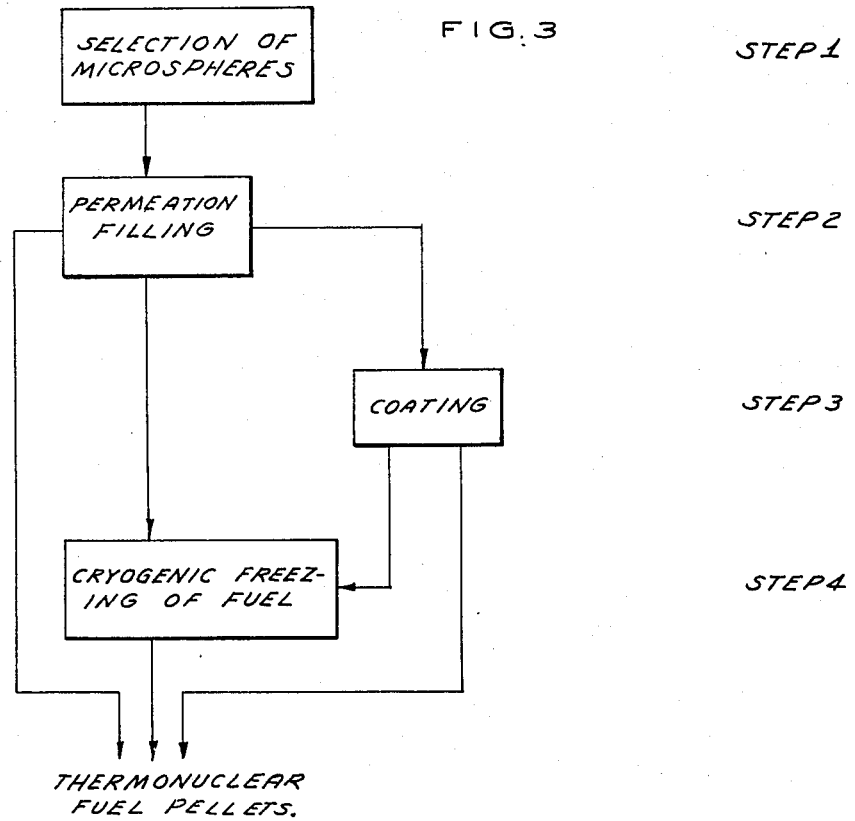
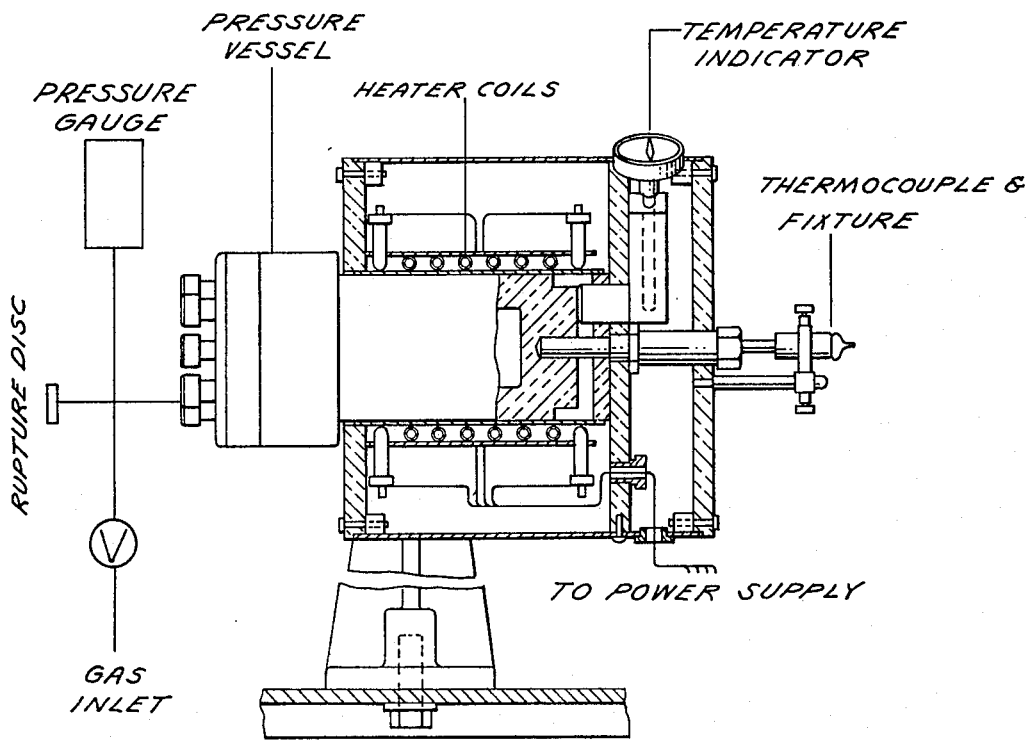

PROCESS FOR THE FABRICATION OF THERMONUCLEAR FUEL PELLETS AND THE PRODUCT THEREOF

REFERENCE TO A COPENDING PATENT APPLICATION

This is a continuing patent application of copending patent application, Ser. No. 339,558, filed on Mar. 9, 1973, now abandoned, and assigned to the assignee of this patent application.

This invention relates to thermonuclear fuel pellets and a process of producing such fuel pellets.

BACKGROUND OF THE INVENTION

Minute quantities of nuclear fuel such as deuterium, tritium, and mixtures thereof are used in various devices to produce a burst of high energy gamma radiation, X-rays, fast neutrons, other forms of radiation, and fusion reactions. Examples of such devices are neutron generators, magnetic confinement devices, electrom beam fusion devices, and laser driven fusion devices. The fast neutrons and various forms of radiation produced from fusion fuel by such devices are useful in producing tritium, simulation studies of nuclear weapons, the testing and radiation hardening of materials, the testing of electronic systems such as those used in anti-ballistic missiles to determine their susceptibility to malfunctioning by being subjected to such radiation, sterlization of insects such as fruit flies, and medical research and treatment of tumors and various cancers.

The minute quantities of fusion fuel used in neutron generators and various fusion reactor devices are usually hydrogen isotopes in the form of solid slabs, cubes, or droplets. While these simple geometries have been adequate for some experimental tests, it is desirable to provide other fuel configurations in large quantities for use in such devices and when available, commercial fusion reactor operations.

To increase the yield of fast neutrons, high energy radiation, X-rays, and energy from fusion fuel when irradiated with laser energy, it is believed to be desirable to have the minute quantity of fusion fuel in the form of a small sphere of gas and preferably in the form of a solid hollow sphere. Such spherical configurations of fusion fuel, which can be referred to as a pellet, may have a diameter which varies all the way from 1/16 of a millimeter (mm) to approximately 2 mm or larger, but is preferably in the range of ⅛ to 1 mm. Such configurations of fusion fuel and methods and apparatus for utilizing laser energy to irradiate fusion fuel in such configurations to obtain a burst of high energy gamma radiation, X-rays, fast neutrons and a fusion reaction are disclosed in the copending U.S. application of Keith A. Brueckner, Ser. No. 337,094, filed Mar. 2, 1973 as a continuation-in-part of application, Ser. No. 12,624, filed Feb. 20, 1970, and copending U.S. application of Keith A. Brueckner, Ser. No. 377,508, filed July 10, 1973 as a continuation-in-part of application, Ser. No. 116,707, filed Jan. 29, 1971, which are incorporated herein by reference. All of these Brueckner patent applications are assigned to the assignee hereof.

Thus, the problems before the art are to provide spherical fuel pellets which can be accurately regulated in dimension and thus are more efficient in producing fast neutrons, high energy gamma radiation, X-rays, and other forms of radiation and more efficient in the ultimate fusion process, and also to provide fuel pellets with a spherical configuration which lends itself to an efficient fusion implosion by the input of laser energy and thus a higher yield of fast neutrons, high energy gamma radiation, X-rays, other forms of radiation, and energy.

OBJECTS OF THE INVENTION

It is, therefore, an object of the present invention to disclose a thermonuclear fuel pellet configuration which conforms to the prescribed requirements of the nuclear physics involved as set forth in the aforementioned Brueckner patent applications incorporated herein by reference, and also to disclose a method for manufacturing these fuel pellets which can be easily regulated and which permits manufacturing at low cost with uniform results under circumstances which are conducive to commercialization and production.

Other objects and features of the invention relating to details of the process, the materials used, and the construction will be apparent in the following description and claims in which the principles of operation, together with the best mode presently contemplated for the invention, are disclosed.

Drawings accompany the disclosure and the various views thereof may be briefly described as:

FIG. 1, a diagrammatic view of a thermonuclear fuel pellet.

FIG. 2, a diagrammatic view showing a fuel pellet with a solid interior spherical lining of thermonuclear fuel.

FIG. 3, a flow chart showing the various steps in the process.

FIG. 4, a view of a pressure vessel heater used in the process.

DETAILED DISCLOSURE OF THE INVENTION

Briefly, the invention contemplates the use of small, hollow shells of a material such as glass having the dimensions desired for the final product. These shells are exposed to the hydrogen isotopes in the form of gas such as deuterium-tritium under conditions of pressure and heat such that the gas will permeate through the walls of the hollow shells or microspheres and be entrapped within. The filled microspheres may then be used either with the fuel in gaseous form or the fuel may be deposited on the inner walls of the sphere by subjecting the sphere to a cryogenic temperature.

The hollow shells to be used for the fuel configuration and in the process will be referred to as microspheres and may be formed of glass, ceramic, carbon, plastic or metal as a basic initial structure. These hollow spheres are available commercially and are sometimes identified by the trademarks MICROBALLOON, ECCOSPHERES and CARBO-SPHERES. They can be obtained in diameters from 10 micrometers to 1000 to 2000 micrometers. These spheres are presently used commercially in syntactic foams, low density structure materials, dielectrics and thermal insulation. Pertinent patents describing the processes and the product of glass and other microspheres are listed in the following Table I.

TABLE I

| Patent No. | Issued | Inventors | Title |
|---|---|---|---|
| 2,797,201 | 6/25/57 | Veatch | Process of Producing Hollow Particles and Resulting Product |
| 3,138,444 | 6/23/64 | Searight | Method and Apparatus |

TABLE I-continued

| Patent No. | Issued | Inventors | Title |
|---|---|---|---|
| | | | for Manufacturing Glass Beads |
| 3,161,468 | 12/15/64 | Walsh | Process for Producing Hollow Spheres of Silica |
| 3,365,315 | 1/23/68 | Beck | Glass Bubbles Prepared by Reheating Solid Glass Particles |
| 3,441,396 | 4/29/69 | D'Eustachio | Process for Making Cellular Materials |
| 3,615,972 | 10/26/71 | Morehouse | Expansible Thermoplastic Polymer Particles |

The invention will be described in connection with glass microspheres although it will be appreciated that other materials might be utilized.

Basically, the microspheres of glass (which is the principal material proposed) are formed by pulverizing a glass containing volatile compounds and injecting the pulverized glass into a gas stream which passes through a hot zone such as that formed by a torch. While in the hot zone, the volatile compounds are vaporized and expand and this, when coupled to the inherent surface tension of glass, causes the molten glass to take the form of a hollow sphere. The process is controlled by the selection of the glass composition, the hot zone temperature, the velocity at which the gases are passed through the hot zone, and the cooling provided thereafter. The commercially available microspheres have been designed to give a relatively low density and therefore have had walls in the neighborhood of 1 to 2 microns thick. The processes may be used to produce microspheres with much thicker walls if this is desired. The following Table II gives examples of properties of commercially available glass microspheres produced by Emerson and Cuming, Inc. Table IIA gives some properties of various available glass compositions.

TABLE II

Properties of Commercially Available Glass Microballoons

| Property | IG 101 | SI | FTL200 |
|---|---|---|---|
| Composition | Sodium Borosilicate | Silica | >95% $SiO_2$ |
| Particle Size Range, Microns (% by weight) | | | |
| >175 | 5 | 0 | 2 |
| 149-175 | 10 | 14 | 8 |
| 125-149 | 12 | 10 | 12 |
| 100-125 | 12 | 12 | 13 |
| 62-100 | 44 | 40 | 52 |
| 44-62 | 10 | 15 | 11 |
| <44 | 7 | 9 | 2 |
| Average Particle Diameter Microns | 80 | 80 | 90 |
| Average Wall Thickness Microns | 2 | 1.5 | 1.5 |
| Softening Temperature or Melting Temperature (°F.) | 900 | 1800 | 2000 |
| Compressive Strength Volume % Survivors at Pressure (psi) | | | |
| 500 | | | 96.3 |
| 1000 | | | 66.4 |
| 1500 | | | 46.2 |

TABLE IIA

| Code Type | Properties of Glass Composition | Annealing Point | Softening Point |
|---|---|---|---|
| vycor (C) | 96% $SiO_2$<br>3% $B_2O_3$<br>1% $Al_2O_3$ | 910° C. | 1500° C. |
| silica (G) fused silica | 100% $SiO_2$ | 1180° C. | 1730° C. |
| 7740 (C) sodium borosilicate | 81% $SiO_2$<br>13% $B_2O_3$<br>2% $Al_2O_3$<br>4% $Na_2O$, $K_2O$ | 565° C. | 820° C. |
| 650 (L) sodium borosilicate | 90% $SiO_2$, $B_2O_3$<br>3% $Al_2O_3$ | — | — |
| 0080 (C) soda lime | 72% $SiO_2$<br>1% $Al_2O_3$<br>10% CaO, MgO<br>17% $Na_2O$, $K_2O$ | 510° C. | 696° C. |
| H phosphate | 5% $B_2O_3$<br>77% $P_2O_5$<br>11% $Al_2O_3$<br>7% ZnO | — | — |
| 1720 (C) aluminosilicate | 62% $SiO_2$<br>5% $B_2O_3$<br>18% $Al_2O_3$<br>15% CaO, MgO | 715° C. | 915° C. |
| P x-ray shield glass | 31% $SiO_2$<br>8% BaO<br>61% PbO | 323° C. | 379° C. |
| G lead borate | 22% $B_2O_3$<br>78% PbO | | |

It will be seen from the above that it is within the state of the art to independently regulate not only the size of the microsphere but the wall thickness and, of course, the chemical composition of the glass. There are two thermonuclear pellet designs which are of immediate interest with respect to the present disclosure. These are shown in FIGS. 1 and 2 respectively.

In FIG. 1, there is shown the structural shell 20 in the form of a cross-section of a sphere and this contains a gaseous thermonuclear fuel 22 which, of course, is invisible in the drawing. The hollow solid shell may be made of glass as indicated above or ceramic, metal, plastic, or carbon and it will contain a gaseous mixture of hydrogen isotopes such as deuterium or a deuterium-tritium mix.

In FIG. 2, the structural shell 20 is shown but in this case it has layered inside of it a solid coating of the thermonuclear fuel 24 leaving a vacuum centrally of the sphere. In the forming of the above pellet designs, there are certain steps in the process which are illustrated in FIG. 3 showing a flow chart.

Step #1 in the process involves the procurement and selection of the microspheres. As has been indicated above, these microspheres are available commercially and the selection involves a consideration of the chemical composition, the size, the wall thickness, the wall strength and the residual gas content. The preferred structural shell material is glass because of its inherent strength, its availability in desired sizes at nominal costs in large quantities, and its relative uniform sphericity and wall thickness.

The selection of a specific glass composition is based upon its permeability to hydrogen isotopes (hereafter including all isotopes of hydrogen individually or in mixtures and in the ortho or para spin states) and its softening temperature. High silica contents favor high permeabilities and high softening temperature. The dilution of silica with other glass formers ($B_2O_3$, $Na_2O$, $K_2O$, $Li_2O$, $Al_2O_3$, PbO and others) lowers both the permeability and the softening temperature.

Any desired glass microsphere size can be sorted out by well-known techniques, wet or dry sieving, cyclone separation, hydraulic elutriation, microscopic hand sorting or micro-radiography to mention a few. The sphericity of the microspheres can be evaluated by micro-radiographic techniques.

The wall thickness dimensions and uniformity can be evaluated by quantitative, micro-radiography and by employing mass separation techniques (such as gas suspension on carefully sized microspheres).

Compressive and tensile wall strengths can be determined by first applying a hydraulic compressive pressure. Separation is performed by introducing the microspheres into a fluid bath. The sealed microspheres float and the broken parts or leaky microspheres sink and thereby separate. Then tensile load may be applied to the microsphere walls by permeation filling of the microspheres by the procedure described later to a pressure higher than desired ultimately. Survivors can be recovered by the sink-float technique mentioned above.

There are residual gases within the selected microspheres which are derived from the blowing agents used in the manufacture. These may be $CO_2$, $H_2O$, or $SO_2$ or mixtures thereof. In some instances, it may be desirable to evacuate these gases by a diffusion process, but the present process contemplates a selective lamination of these gases to reduce the effect on the fusion process.

The first step of the process also involves a proper cleaning of the microspheres to remove the particulate matter which may be present on the exterior surface. A typical cleaning process utilizes hot trichloroethylene for the removal of organic material and a water detergent solution wash in an ultrasonic agitated bath for the removal of salts and other water soluble materials. These steps may be followed by a rinse in pure water, an etch in 10% solution of hydrofluoric acid to strengthen the microsphere, a further rinse in pure water to remove the acid residue, and a drying step in methanol.

The second basic step in the process is permeation or diffusion filling of the microspheres. This involves loading the selected microspheres into a commercially available pressure vessel as illustrated in FIG. 4 and pressurizing the vessel with deuterium-tritium gas while heating the pressure vessel to temperatures ranging from 150° C. to 800° C. as limited by the sintering temperature of the specific glass used to prevent adherence of the particles to each other. The pressure vessel in FIG. 4 has a suitable interior chamber surrounded by heater coils connected to a power supply. Suitable temperature indicators and thermocouples are provided. A lock-on cover has a gas pressure inlet and a pressure gauge. The gas filling pressure is predetermined to provide the desired quantity of deuterium-tritium within the sphere. First of all, it must be appreciated that the permeation rates of hydrogen or hydrogen isotopes such as deuterium-tritium and similar materials through glass is known, and such data is available in a book entitled *Vacuum Technique* by Saul Dushman, published by John Wiley & Sons, Inc., New York 1949. The following Table III indicates permeation data taken from this publication.

TABLE III

| System | Diffusion Data Compilation Permeability Data |
|---|---|
| $SiO_2$—$H_2$ | $10 g_{10}.(2.08 \times 10^8 K) = 1.735 - \frac{1888}{T}$ |
| $SiO_2$—$H_2$ at 700° C. | $K = 2.1 \times 10^{-9}$ |
| $SiO_2$—$D_2$ at 700° C. | $K = 1.7 \times 10^{-9}$ |
| $SiO_2$—$H_2$ at 900° C. | $K = 6.4 \times 10^{-9}$ |
| Pyrex-$H_2$ at 520° C. | $K = 2.0 \times 10^{-11}$* |

K = permeability (cc of gas (STP) per sec per $cm^2$ area per mm thickness per cm of Hg pressure head)
T = temperature (°K.)
*N. W. Taylor and W. Rast, "The Diffusion of Helium and of Hydrogen Through Chemically Resistant Glass," Journal of Chemical Physics, 6, October 1938, p. 619.

From the above equation in Table III, it has been determined that with respect to $H_2$, silica has a permeability K factor of $3 \times 10^{-9}$ at 750° C. and a K factor of $2 \times 10^{-11}$ at 25° C., while sodium borosilicate has a K factor of $2 \times 10^{-11}$ at 520° C.

Using the published information, it will be seen that hydrogen permeation through silica ($SiO_2$) shows permeability at 520° C. to $1.1 \times 10^{-9}$. The permeability for Pyrex (typically Corning-code 7740) at the same temperature is $1.97 \times 10^{-11}$. Integrating the well-known Fick's law equation for diffusion under the proper conditions for filling the hollow spheres, the following equation was derived:

$$t_{0.99} = 5.50 \frac{xr}{KT} \quad \text{(Equation 1)}$$

where
$t_{0.99}$ = time for the inside hydrogen pressure to reach 99% of the external hydrogen pressure (sec.)
x = thickness of glass wall (mm)
r = radius of small hollow sphere (cm)
T = temperature of filling (°K.)
K = permeability (cc of gas (STP) per sec. per $cm^2$ area per mm thickness per cm of Hg pressure head.

Using Equation (1) and the gas permeabilities given above, the specific time required to raise the internal hydrogen pressure to 99% of the external pressure is between 50 and 2600 sec. for a temperature of 520° C. The external hydrogen pressure and, therefore, the internal hydrogen pressure attained are not limited by the permeation requirements. The strength of the glass wall limits the pressure gradient across the glass wall during filling and later during storage where the external pressure is reduced to 1 atmosphere.

The ultimate pressure contained in a hollow glass microsphere is limited by the bursting strength of the shell. Using the familiar hoop stress formula (Equation 2), the pressure across the wall ($\Delta P$) can be related to the tensile strength (T.S.) of the microsphere wall.

$$\Delta P = \frac{(T.S.)t}{r} \quad \text{(Equation 2)}$$

The tensile strength of glasses has received a great deal of attention in the literature. It has been established that surface imperfections greatly affect the tensile strength. Normally, a strength of 100 psi is used for structural design. However, it is also known that glass fibers having 1-2 micron diameters exhibit tensile strengths between 700,000 and 2,000,000 psi. From all published data, it is very likely that the strength of the glass used for glass microspheres has the higher strengths. Using Equation 2, it has been calculated that internal pressures of 15,000 psi or roughly 1000 atmospheres could be contained in glass microspheres. Current requirements for thermonuclear fuel pellets indicate 100 atmospheres is adequate.

The pressure and temperature of the deuterium-tritium gas surrounding the microspheres is maintained for a period sufficient to cause the pressure inside the microsphere to rise to 99% of that of the external pressure. This period has been precisely established by a series of experiments in which the particular microspheres are treated at various temperatures for various periods. After these tests, and to confirm the hydrogen isotope pressure inside the microspheres after the diffusion filling, the microspheres are broken and the quantities of released gases are measured by (1) mass spectrometer gas analysis, and (2) actual size of the gas bubble in a fluid. As one example, a batch of microspheres was treated at 300° C. under 100 atmospheres of pressure for a period of 36 hours to obtain an internal pressure of approximately 99 atmospheres and a contained gas density of $10^{-2}$ grams per cubic centimeter.

After holding the temperature and pressure for the desired time period, the temperature of the pressure vessel is then lowered to room temperature and finally the gas pressure external to the microsphere is relieved. Inasmuch as the permeation rate of the gas at room temperatures is typically $10^4$ times less than that at elevated temperatures, the contained gases will remain trapped in the microspheres during subsequent handling operations.

Using the $SiO_2$-$H_2$ equation (Table III) for permeability, the permeability diminishes to $1.41 \times 10^{-13}$ at room temperature and that for Pyrex at least an order of magnitude less. The leakage rate can be predicted by the same formulae (Equation 1) developed for the filling prediction. Using Equation 1, the time required to reduce the internal hydrogen pressure to 1% of the original in a quartz microsphere is over 100 hours, and in a Pyrex microsphere over 1000 hours. Even further reductions in differential gas pressure and permeability can be realized by storing the spheres at lower temperatures (dry ice or liquid nitrogen temperatures).

After the pressure filling step, it may be desirable to separate microspheres which have been broken in the process or by mechanical handling from those that are intact after the filling operation. This can again be easily accomplished by utilizing a flotation process.

The completion of Step #2, that is, the filling with the hydrogen isotopes, will provide a thermonuclear fuel pellet which may be utilized in a fusion process as described in the aforesaid referenced Brueckner applications. A third step in the process which may be in some cases optional involves a coating of the filled microspheres. There may be a variety of reasons for providing this coating. In the first place, it may serve to provide a better seal for the microsphere as a diffusion barrier to improve storage. For example, a lead or bismuth glass, a soda-lime glass, copper, or aluminum coating may serve this function. Secondly, a coating may be applied to improve the surface properties with respect to increasing the laser light absorption. Thirdly, a coating may thicken the structural wall to improve the pellet implosion properties; and, fourthly, a coating may serve as an energy channel to provide a more uniform fuel pellet illumination. These layers may be applied by vacuum vapor deposition, ion sputtering, chemical sprays, electrolytic plating, or fluidized bed techniques.

The fourth and final step in the processing of the fuel pellets involves subjecting the pellets to a cryogenic temperature. There are two purposes for this procedure. First, any impurity gases within the pellet will be selectively frozen out on to the inside surface of the structural shell by selecting a temperature intermediate between the freeze-out temperature of the impurity gas and the freeze-out temperature of the hydrogen isotopes. For example, at liquid nitrogen temperatures $CO_2$ and $H_2O$ will freeze out leaving a purified hydrogen isotope gas in the pellet core. This step alone will provide a pellet which may be utilized in fusion operations if suitable laser input power is available.

The second reason for the use of the cryogenic temperatures would be to freeze out the hydrogen isotope gas as a solid layer on the inside of the microsphere. There are basic and important reasons from the point of view of the fusion process for having the nuclear fuel in this particular configuration.

Freezing of the gases within the microspheres may be accomplished in a number of different ways. It is known that liquid hydrogen, deuterium and tritium will wet a glass surface which insures that condensation on the glass will form a continuous uniform layer as the temperature decreases. The rate of temperature decrease is also important to insure an even layer of fuel. The freezing rate can either be such that any liquid deposit cannot conglomerate unevenly in the sphere, or it is also possible to hold the microspheres in suspension while rotating or tumbling them during the cooling operation. This can be done, for example, by suspending the microsphere in a glass capillary tube while flowing cold helium at $<13°$ K. upwardly through the tube. The suspended microsphere will rotate or tumble, thus providing uniform cooling on all sides so as to achieve even distribution of the freezing gas within. There is considerable information in the literature relative to the freezing of hydrogen isotopes. The following Table IV summarizes the critical points regarding the liquification and solidification of hydrogen isotopes and their mixtures.

TABLE IV

Critical, Boiling Point, and Triple Point Constants Predicted Graphically for the Hydrogen Isotopes Comparisons of Predicted Values with Available Experimental Values

| | Boiling Point $T_b$ (°K.) | | Critical Constants | | | | | | Triple Point | | | |
|---|---|---|---|---|---|---|---|---|---|---|---|---|
| | | | $T_c$ (°K.) | | $P_c$ (atmos) | | $V_c$ (cc/mole) | | $T_t$ (°K.) | | $P_t$ (atmos) | |
| | expt | graph | expt | graph | expt | graph | expt | graph | expt | graph | expt | graph |
| $H_2$ | 20.39 | 20.4 | 33.24 | 33.2 | 12.797 | 12.8 | 66.95 | 67.0 | 13.96 | 14.0 | 0.071 | 0.071 |
| HD | 22.13 | 22.4 | 35.91 38.35 | 36.4 | 14.64 16.432 | 15.1 | 62.8 | 62.8 | 16.60 | 16.8 | 0.122 | 0.130 |
| $D_2$ | 23.57 | 23.6 | 38.26 | 38.3 41.1 | 16.28 | 16.4 18.9 | 60.3 | 60.3 56.7 | 18.72 | 18.5 | 0.169 | 0.164 |
| HT | | 23.6 | | 38.3 | | 16.4 | | 60.3 | | 18.5 | | 0.164 |
| DT | | 24.3 | | 39.5 | | 17.3 | | 58.5 | | 19.7 | | 0.188 |
| $T_2$ | 24.92 | 24.9 | | 40.6 | | 18.1 | | 57.1 | 20.27 | 20.5 | 0.207 | 0.207 |

TABLE IV-continued
Critical, Boiling Point, and Triple Point Constants Predicted Graphically for the Hydrogen Isotopes Comparisons of Predicted Values with Available Experimental Values

| Boiling Point | | Critical Constants | | | | | | Triple Point | | | |
|---|---|---|---|---|---|---|---|---|---|---|---|
| $T_b$ (°K.) | | $T_c$ (°K.) | | $P_c$ (atmos) | | $V_c$ (cc/mole) | | $T_t$ (°K.) | | $P_t$ (atmos) | |
| expt | graph | expt | graph | expt | graph | expt | graph | expt | graph | expt | graph |
| | | | 43.7 | | 20.8 | | 53.7 | | 21.65 | | 0.248 |

This table is taken from an article by A. S. Friedman, D. White, and H. L. Johnson, entitled "Critical Constants, Boiling Points, Triple Point Constants and Vapor Pressure on Fixed Isotopic Hydrogen Molecules Based on Simple Mass Relationship," Journal of Chemical Physics, Vol. 19, No. 1, January 1951. It will be seen from this table that while the various isotopes of hydrogen vary in detail from one another, in general, their critical constants and triple point are about the same and therefore the discussion of one isotope would approximate the other isotopes.

Additional information on the characteristics of deuterium is shown in an article by R. Prydz, K. D. Timmerhaus, and R. B. Stewart entitled "The Thermal Dynamic Properties of Deuterium," published in *Cryogenic Engineering*, Vol. 13 (1968), pages 384 to 396. This article includes temperature-enthalpy diagrams. These diagrams are used to predict the behavior of the deuterium during cooling. They indicate that cooling under equilibrium conditions and starting with $D_2$ gas pressures between 10 to 100 atmospheres in a sealed microsphere, the gas will condense to liquid deuterium, then to solid ice. Standard calculations on condensing liquids indicate that it would take greater than 0.3 of a second for appreciable flow to occur. This flow must be avoided to insure a uniform coating. Best results are obtained by freezing the hydrogen isotope to solid ice in a fraction of a second to prevent liquid flow within the microsphere. This is accomplished by placing the microsphere in a liquid helium pool so that the cooling is the result of thermal conductivity through the silica. Standard heat transfer calculations indicate that it takes $8 \times 10^{-5}$ seconds to go through the freezing process. This freezing time is very favorable from the point of view of retaining a uniform liquid layer on the inside of the microsphere during the cooling period. It is highly probable that intermediate cooling mechanisms providing a slightly slower freezing time might be quite adequate to retain the liquid hydrogen in place while solidification is completed. The presence of tritium gas in the microsphere will contribute a small amount of energy by radioisotopic heating. However, this has been evaluated and would have a minor effect on the calculations above discussed.

Filling of microspheres with $H_2$, $D_2$, and $T_2$ by permeation has been accomplished under the above-suggested conditions of heat and pressure. Cleaned and sized microspheres were placed in a pressure vessel illustrated in FIG. 4 filled with hydrogen at a pressure of 100 atmospheres (1500 psi), heated to 300° C., and held for 96 hours. The pressure at this temperature was 2800 psi. After treatment or permeation filling, the pressure in the surviving individual microspheres was determined by breaking a filled microsphere while submerged in mineral oil, and observing with a microscope the size of the resulting gas bubble. The results indicated 40 to 90 atmospheres of included gas depending on the wall thickness of the microspheres as compared with ⅓ atmosphere prior to permeation filling. After 30 days at ambient temperatures, there was no detectable change in the determined internal pressure. The above process has also been accomplished using deuterium-tritium gas.

It will thus be seen that the disclosed process may be utilized to produce enclosed minute and predetermined quantities of fusion fuel in gaseous form, and also the same fuel may be provided in the form of a hollow spherical shell of solid material within the glass microsphere held at cryogenic temperatures.

We claim:

1. A nuclear fuel pellet which comprises a hollow sphere having a homogeneously integral and continuous wall consisting essentially of at least one of the group of glass, ceramic, metal and plastic materials, said wall having a permeability rate for hydrogen isotopes which decreases with decreasing temperature and is sufficiently low at room temperature and one atmosphere pressure to retain within said sphere hydrogen isotopes at pressures of at least ten atmospheres, said wall of said hollow sphere having a diameter not greater than two millimeters, and a quantity of a fuel including at least one isotope of hydrogen contained within the interior of said hollow sphere in an amount sufficient to possess a pressure of at least ten atmospheres at room temperature.

2. The fuel pellet set forth in claim 1 in which said fuel contained within said sphere is in an amount sufficient to possess a pressure of at least forty atmospheres at room temperature.

3. A fuel pellet as defined in claim 1 in which said hollow sphere has a wall thickness of at least one micron.

4. A fuel pellet as defined in claim 1 in which said fuel is in gaseous form.

5. A fuel pellet as defined in claim 1 in which said fuel is disposed as a solidified layer on the inner surface of said hollow sphere such that said fuel forms a solidified hollow spherical shell.

6. A fuel pellet as defined in claim 1 in which any gaseous impurities in said hollow sphere are disposed as a layer of solidified impurities on the inner surface of said hollow sphere and said fuel is disposed within said layer of solidified impurities.

7. A fuel pellet as defined in claim 6 in which said fuel is disposed as a soldified hollow spherical shell of fuel within said layer of solidified impurities disposed on the inner surface of said hollow sphere.

8. A fuel pellet as defined in claim 1 further comprising a continuous coating of glass or metal on the exterior of said hollow sphere.

9. A fuel pellet as defined in claim 8 wherein said coating consists essentially of at least one of the group of lead glass, bismuth glass, soda-lime glass, copper and aluminum.

10. The fuel pellet set forth in claim 5 which said fuel contained within said sphere is in an amount sufficient to possess a pressure of at least forty atmospheres at room temperature.

11. The fuel pellet set forth in claim 6 in which said fuel contained within said sphere is in an amount sufficient to possess a pressure of at least forty atmospheres at room temperature.

12. The fuel pellet set forth in claim 8 in which said fuel contained within said sphere is in an amount sufficient to possess a pressure of at least forty atmospheres at room temperature.

* * * * *